US012670486B2

(12) United States Patent
Rossi et al.

(10) Patent No.: US 12,670,486 B2
(45) Date of Patent: Jun. 30, 2026

(54) SMART CASH DRAWER AUTO WEIGHING SYSTEM

(71) Applicant: APG Cash Drawer, LLC, Minneapolis, MN (US)

(72) Inventors: Anthony A. Rossi, East Sussex (GB); Gianandrea Manfredi, Brighton (GB)

(73) Assignee: APG CASH DRAWER LLC, Minneapolis, MN (US)

( * ) Notice: Subject to any disclaimer, the term of this patent is extended or adjusted under 35 U.S.C. 154(b) by 157 days.

(21) Appl. No.: 17/875,685

(22) Filed: Jul. 28, 2022

(65) Prior Publication Data

US 2023/0034652 A1 Feb. 2, 2023

Related U.S. Application Data

(60) Provisional application No. 63/203,696, filed on Jul. 28, 2021.

(51) Int. Cl.
G06Q 20/20 (2012.01)
(52) U.S. Cl.
CPC .................................. G06Q 20/208 (2013.01)
(58) Field of Classification Search
CPC ......... G06Q 20/208; G07D 11/23; G06F 7/00
USPC .......................................................... 705/23
See application file for complete search history.

(56) References Cited

U.S. PATENT DOCUMENTS

| | | | |
|---|---|---|---|
| 10,127,776 B2 | 11/2018 | Rees | |
| 2005/0077142 A1* | 4/2005 | Tam ...................... | G07F 19/203 |
| | | | 194/217 |
| 2019/0221066 A1* | 7/2019 | Bernhardt ............ | G07G 1/0009 |
| 2022/0277256 A1* | 9/2022 | Mellon ................ | G06Q 10/087 |

OTHER PUBLICATIONS

PCT International Search Report and Written Opinion for International Application No. PCT/US2022/038664, Date of Mailing: Nov. 30, 2022, 9 pages.
Supplementary Search Report for European Patent Application No. 22850311.6, Dated May 14, 2025, 7 pages.

* cited by examiner

*Primary Examiner* — Ariel J Yu
*Assistant Examiner* — Denisse Y Ortiz Roman
(74) *Attorney, Agent, or Firm* — Jonas R. Mellang; Kelly, Holt & Christenson, P.L.L.C.

(57) ABSTRACT

A cash drawer is provided. The cash drawer includes a plurality of compartments configured to hold a plurality of objects. The cash drawer further includes a weight sensor coupled to each of the plurality of compartments, the weight sensor being configured to detect a weight change within a respective compartment and produce an output indicative of the detected weight change. The cash drawer further includes a processor configured to receive the output from the weight sensor and determine an object count based on the detected weight change within the respective compartment.

9 Claims, 7 Drawing Sheets

SMART CASH DRAWER AUTO WEIGHING SYSTEM

CROSS-REFERENCE TO RELATED APPLICATION

The present application is based on and claims the benefit of U.S. Provisional Patent Application Ser. No. 63/203,696, filed Jul. 28, 2021, the content of which is hereby incorporated by reference in its entirety.

BACKGROUND

Anyone who has been in a retail store is familiar with the checkout stand; the checkout stand is where one pays for the selected items. Checkout stands, also commonly referred to as check stands, can be arranged in a broad variety of configurations. The checkout stand can include one belt, two belts, three belts, or merely have a stationary surface, generally supported by a counter or cabinet. A barcode scanner is typically recessed into the counter or cabinet. Also included at the checkout stand are the register, cash drawer, a keyboard, a credit card machine (often referred to as a credit card swipe and pin pad machine), a receipt printer, monitor or display, telephone, and other such accessory equipment. A checkout stand can also include equipment for accepting wireless payment information. The register, cash drawer, and other equipment are typically positioned on a cabinet often referred to as a cash stand, which is positioned to the left or right of the cashier, at a right angle to the check lane as the cashier is looking at the customer.

One of the most important features of the checkout stand is the cash drawer. A cash drawer may be a flip-top or a lay-flat cash drawer. A flip-top cash drawer is one where the top of the cash drawer rotates on a pivot such that the lid rotates up and away from a front face of the cash drawer, resulting in the currency within the cash drawer becoming readily accessible. A lay-flat cash drawer, commonly seen in the United States, incorporates sliders such that, when unlocked, the cash drawer physically rolls forward revealing the cash and change inside.

When a customer pays a cashier in cash, it is often required of the cashier to return change to the customer in a transaction. In these transactions, when a cashier is serving a customer, cash losses can occur when the wrong amount is taken for payment, or the incorrect amount of change is given. Additionally, the process of counting the correct amount of change can be cumbersome, resulting in an unnecessary amount of time lost to return the correct amount of change to the customer.

SUMMARY

A cash drawer is provided. The cash drawer includes a plurality of compartments configured to hold a plurality of objects. The cash drawer further includes a weight sensor coupled to each of the plurality of compartments, the weight sensor being configured to detect a weight change within a respective compartment and produce an output indicative of the detected weight change. The cash drawer further includes a processor configured to receive the output from the weight sensor and determine an object count based on the detected weight change within the respective compartment.

DETAILED DESCRIPTION OF ILLUSTRATIVE EMBODIMENTS

As detailed above, when a cashier is serving a customer, cash losses can occur when the wrong amount is taken for payment, or the incorrect amount of change is given. One solution for manually counting currency within a cash drawer is measuring the difference in weight of the currency with a previously measured weight and determining the change value relative to a standard. In some applications, a cash drawer can weigh and count the currency once the cash drawer has been closed following a cash transaction. The reason for weighing and counting when the cash drawer is closed is so the weighing element within the cash drawer is not compromised by cashier hands, or other non-cash factors. Applying pressure on a weighing element during the weighing and counting cycle compromises the weighing values and results in an incorrect final weighing count. While this method can improve change counting accuracy, the cash drawer does not update the cashier with the new change count until after the transaction has completed and the cash drawer is closed. Accordingly, a system that allows for counting currency and providing updated values based on weight in real time to a user is desired.

As further described below, the smart cash drawer auto weighing system addresses at least some of these concerns by detecting and counting cash placed into and removed from the cash drawer as it happens so the cashier knows exactly how much they have placed in or removed from the cash drawer while the cash drawer is open, and the customer is being served. By providing cash movements as they happen, the cashier can be assured that they have taken the correct cash amount and given the correct change amount, improving the customer experience and reducing cash losses.

Figure 1:
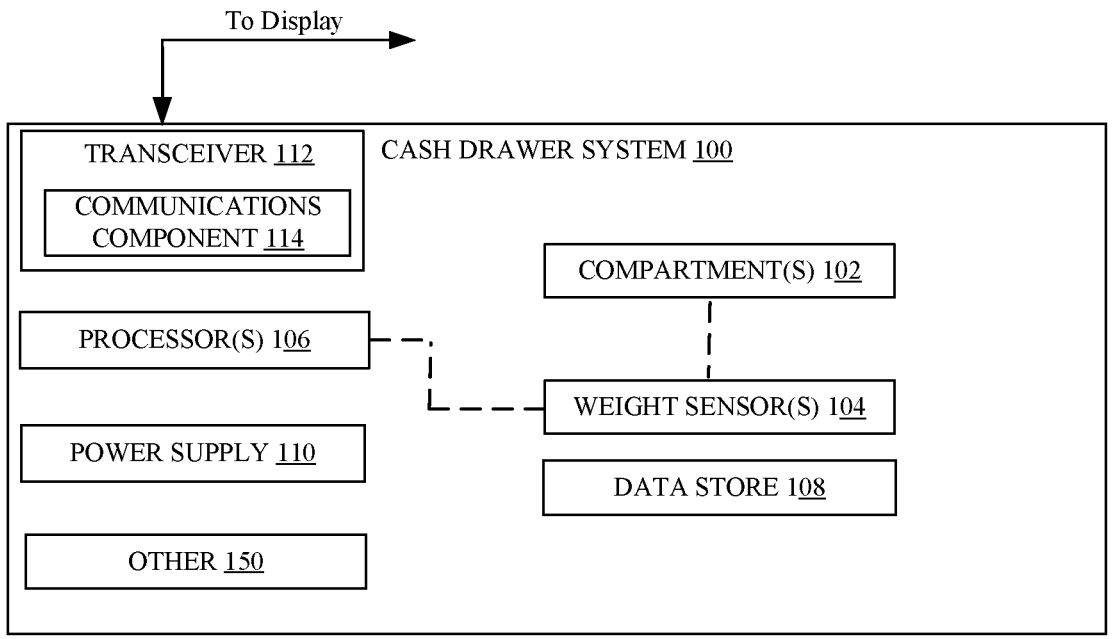
FIG. 1 is a block diagram showing an example cash drawer auto weighing system.

FIG. 1 is a block diagram showing an example cash drawer auto weighing system. Cash drawer system 100 illustratively includes one or more compartments 102, weight sensor(s) 104, processors 106, datastore 108, power supply 110, and can include other items as well, as indicated by block 150. Compartments 102 are configured to receive currency (e.g., notes and/or coins) or other items. Each compartment 102 is coupled to one or more weight sensors 104. The weight sensors can be, for example, disposed beneath compartments 102 to sense the weight of objects within compartments 102. In one example, the weight sensors are disposed beneath the compartment tray. In another example, the one or more weight sensors can be disposed at or near the bottom or base within each respective compartment. As indicated in FIG. 1, a plurality weight sensors can be utilized in cash drawer system 100. For example, one weight sensor can be disposed and/or coupled to one respective compartment 102. However, in another example, more than one weight sensor 104 can be utilized for any one compartment 102. The weight sensors 104 can be, for example, load cells. However, it is expressly contemplated that weight sensors 104 can be a different sensor capable of detecting and transmitting signals indicative of a measured weight. Weight sensors 104 generate signals indicative of the weight of the objects within compartments 102. As further discussed below, the one or more weight sensors can, in one example, include an analog digital converter (ADC) that operates by continuously gathering and transmitting analog signal references in small samples for each respective weighing element.

Processor(s) 106 receive signals from the one or more weight sensors 104 and can determine a weight of the objects within compartments 102. For instance, processor(s) 106 can be configured to carry out the operations described below with respect to FIGS. 3-4. In one example, processor(s) 106 are configured to receive the gathered ADC references in order to calculate an average to be used as an indicator of potential changes in weight on a given weight sensor 104. Additionally, processor(s) 106 can control and/ or monitor other components of smart cash drawer 100 as well. For example, processor(s) 106 can store data into data store 108. Or for example, processor(s) 106 can retrieve and implement software from data store 108. In one example, and further described below, processor(s) 106 can store previously determined objects weights for use in subsequent currency calculations.

Power supply component 110 facilitates any needed power conditioning, transformation, etc. that may be needed to power the components of cash drawer system 100. For instance, in a situation in which system 100 receives power from an external power source (e.g., a wall outlet), power supply component 110 converts the current into one or more direct currents that are fed to the different components of the cash drawer. Similarly, in a situation in which cash drawer system 100 receives power from an Ethernet source, power supply unit 110 performs any needed conversions/transformations of power so that the cash drawer components receive their electrical requirements.

Cash drawer system 100 illustratively includes transceiver 112 having a communications component 114. Transceiver 112 is configured to communicate any desired data, signals, and/or other information to a display. For example, transceiver can transmit information pertaining to currency count based on weight determination from weight sensors 104 to a display for a user to view in real time, as detailed below. In one example, the display can be a display directly on the cash drawer. However, in another example, the display can be a display disposed externally from the crash drawer. For example, transceiver 112 can send information to any of the environments and/or devices described below with respect to FIGS. 6-7. Transceiver 112 can communicate to a display using either a wired connection or wireless configuration.

Figure 2:
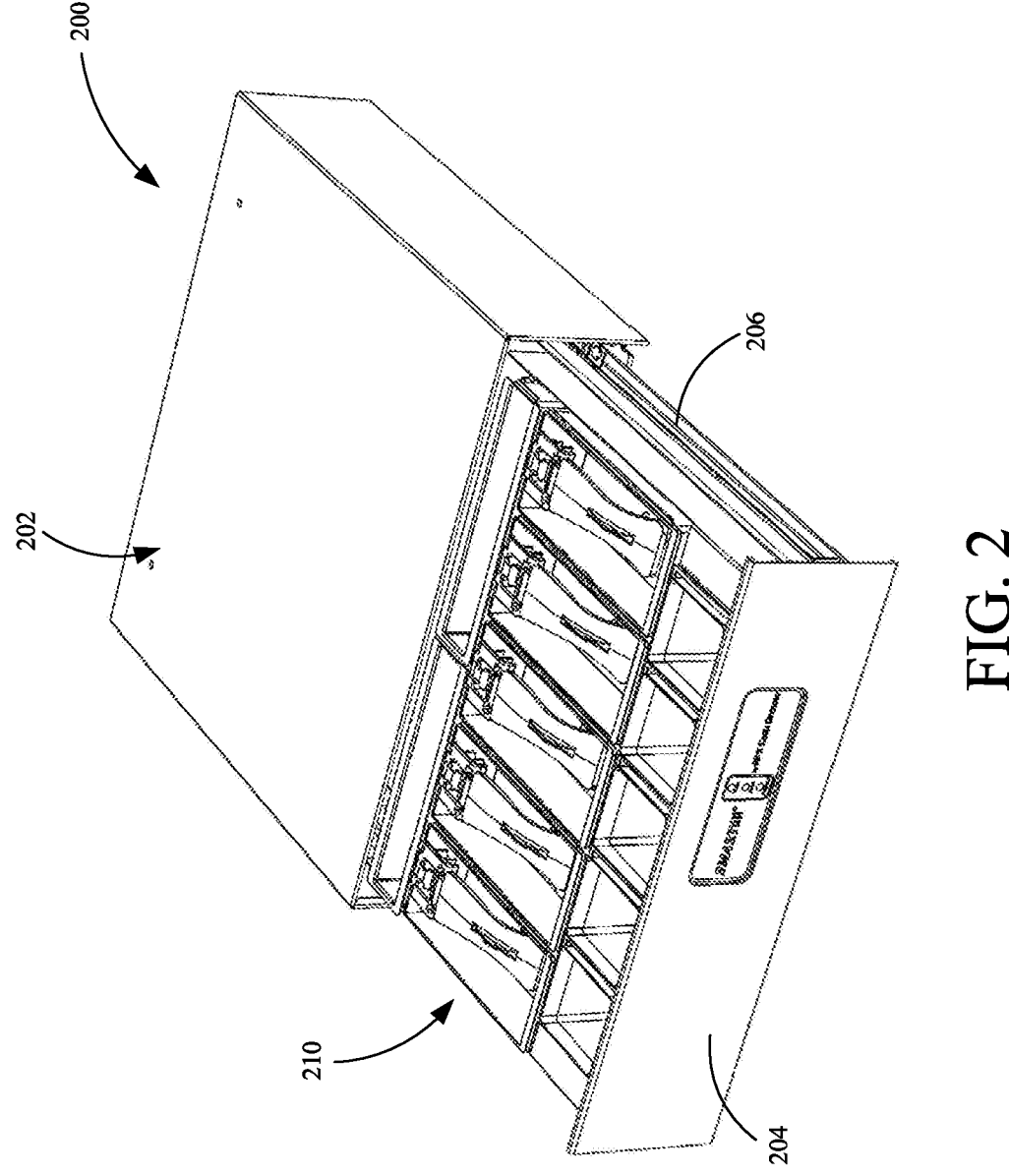
FIG. 2 is a perspective view showing an example cash drawer.

FIG. 2 is a perspective view showing one example of a cash drawer. However, it is expressly contemplated that any other type of cash drawer of any configuration can be utilized in the smart cash drawer auto weighing system as well. FIG. 2 shows cash drawer 200 illustratively including a drawer housing 202, a movable drawer 204, a set of slides 206 that enable drawer 204 to move into and out of housing 202, and a till 210 for holding currency, receipts, etc. Cash drawer 200 also includes one or more weight sensors (not shown). In one example, the weight sensors can be disposed within drawer 204 and underneath till 210. In another example, the weight sensors can be disposed on or within till 210.

As shown in FIG. 2, till 210 includes a plurality of individual compartments configured to retain objects such as currency. The weight sensors can be coupled to the compartments within till 210 and are configured to detect a change in weight within a respective compartment. For example, as shown in FIG. 2, eleven compartments are disposed within till 210. Each compartment can have a corresponding weight sensor configured to sense a weight change with the compartment and responsively generate one or more sensor signals.

As described above, the smart cash drawer auto weighing system operates in real time by providing a user with a currency count relative to one or more weight measurements as a user is operating the cash drawer. For instance, the auto weighing system can be configured to engage in the object count process (described below with respect to FIGS. 3-4) when a user opens drawer 204. In one example, a sensor (not shown) can be disposed within housing 202 to sense when drawer 204 has been opened, and consequently that object counting should begin.

Figure 3:
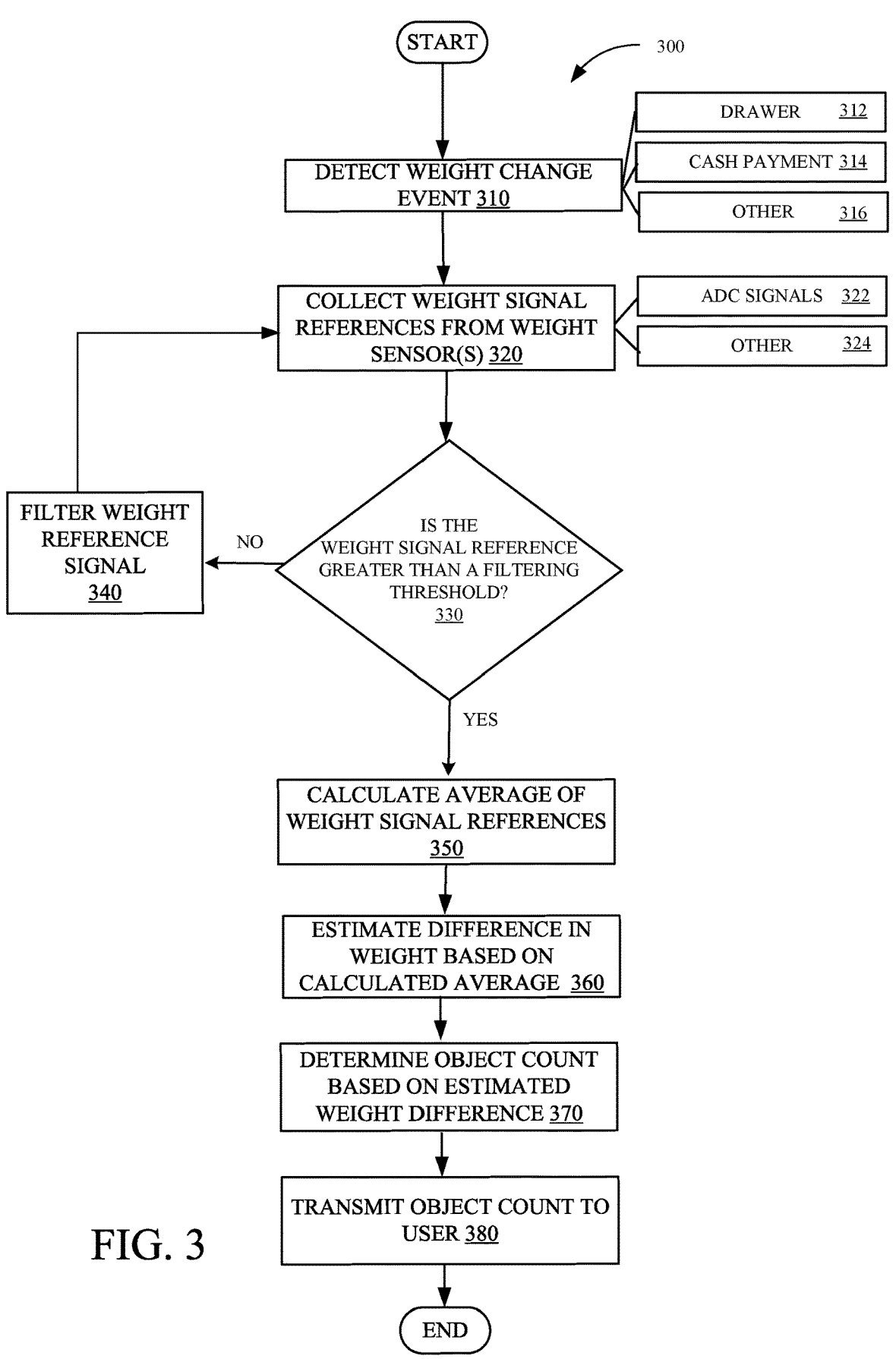
FIG. 3 is a flow diagram showing an example operation of collecting weight signal references.

FIG. 3 is a flow diagram showing an example operation of collecting weight signal references. Operation 300 begins at block 310 where a weight change event is detected, signaling that the auto weighing system should begin collecting weight references. In one example, as indicated by block 312, detecting a weight change event can include detecting when the cash drawer has been opened, indicative of a cash transaction occurring between a cashier and a customer. As indicated by block 314, detecting a weight change event can also include detecting when a setting has been activated on the cash drawer indicating that a cash transaction is to occur. In another example, detecting a weight change event can also include both detecting a cash transaction setting and that the cash drawer has been opened. Additionally, it is expressly contemplated that other weight change events can occur as well, as indicated by block 316.

The operation proceeds at block 320 where weight signal references are collected by the one or more weight sensors within the auto weighing system. The weight sensors can be, for example, the weight sensors described above with respect to FIG. 1. Collecting weight signal references can include, for example, continuously gathering ADC references in small samples from each weight sensor, as indicated in block 322. Additionally, it is expressly contemplated that other sensor signals can be collected as well, as indicated by block 324.

The operation proceeds at block 330 where each weight signal reference gathered by the one or more weight sensors is compared to a filtering threshold. Filtering of the weight signal references can include, for example, the SMARTtill Drift/Creep/nulling interval read process, as described in U.S. Pat. No. 8,844,808. The content of U.S. Pat. No. 8,844,808 is hereby incorporated by reference herein. In another example, the filtering threshold can also include one or more reference weights corresponding to weight and/or pressure applied by noise, vibrations, etc. common to the particular workplace. The reference weight can be, for example, stored within data store 108 described above with respect to FIG. 1. Additionally, it is expressly contemplated that other methods of filtering can be utilized as well. Filtering of the weight signal references includes filtering out weight reference signals that correspond to noise, vibration, and/or interactions caused by the cashier. For example, vibrations caused by the cashier operating the cash drawer can result in weight change detection by the weight sensors. Examples of such interactions can also include a pressure applied when the cashier's hand touches the compartment while removing or adding cash into the cash drawer, which can result in a false weight reading. By comparing each weight signal reference against a filtering threshold, any false and/or incorrect weight signals can be weighted differently and/or discarded. As indicated by block 340, if any particular weight signal reference does not meet the filtering threshold, the weight reference signal is filtered out and/or otherwise discarded, and the operation proceeds back to block 320 where weight signal references continue to be collected.

If the weight signal reference meets or exceeds the filtering threshold, the operation proceeds at block 350 where an average is calculated for the weight signal references. Each weight sensor in the auto weighing system operates asynchronously. That is, each weight sensor is monitored asynchronously as weight is added or removed. In this way, each weight sensor independently and continuously gathers weight signal references for its respective compartment within the cash drawer. For the samples gathered for a given weight sensor, an average is calculated that can be used as an indicator of potential changes in weight on the respective sensor.

The operation proceeds at blocks 360 and 370, where a difference in weight based on the calculated average is estimated and an object count based on the estimated weight difference is determined. Specifically, a mean average based on all captured sample references is calculated, which is then used as the weighing element reference point for the purpose of calculating whether to update/report a new count or update the current ADC reference point for tracking drift of the current count. The process of estimating the weight difference using the calculated average and determining the object count based on the estimated weight difference is described in further detail below with respect to FIG. 4.

The operation proceeds at block 380, where the object count is transmitted to a user. The object count can include, for example, a currency count indicative of the change in currency within the cash drawer relative to the change in weight. Additionally, the object count can further include an indication of the change in weight detected from the one or more weight sensors. The object count can be transmitted to a user in a number of ways. For example, the object count can be transmitted to a display for visual observation by the user. Transmitting the object count can include utilizing any of the environments and/or devices described below with respect to FIGS. 6-7.

Figure 4:
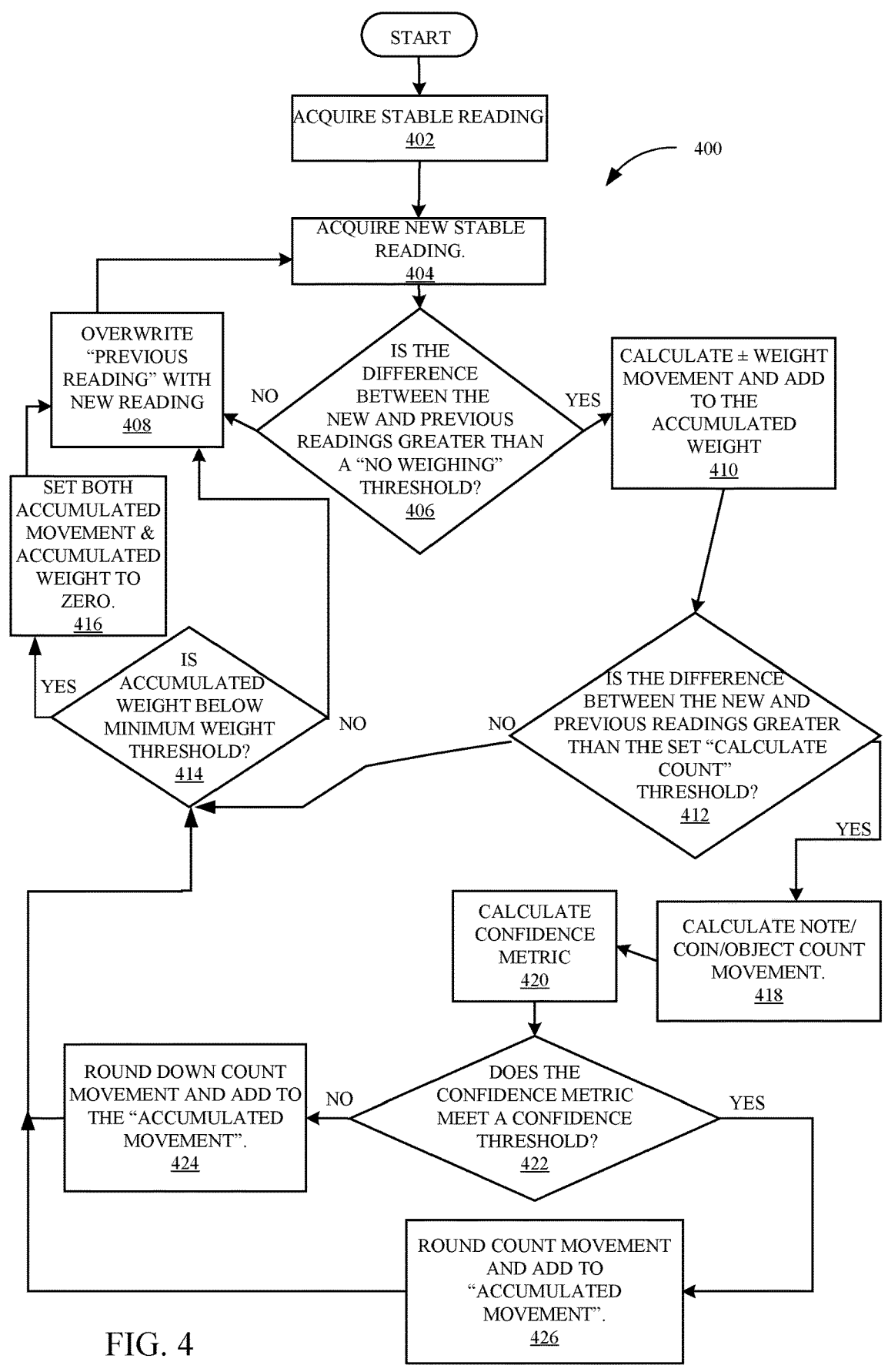
FIG. 4 is a flow diagram showing an example operation of determining an object count in a cash drawer auto weighing system.

FIG. 4 is a flow diagram showing an example operation of determining an object count in a cash drawer auto weighing system. The operation operates in relation to shifts above and below the zero-reference point and applies appropriate thresholds that ensures the zero point, and the activation of the tare function are not accidently activated by cashier interactions, thus maintaining an accurate measurement of the known weight present on each weighing element and its associated count. Operation 400 begins at block 402 where an initial stable weight reference from one or more weight sensors is obtained. The initial stable weight reference can be, for example, the averaged weight signal reference for a given weight sensor described above with respect to FIG. 3. In one example, the stable reading can be an average of the ADC references gathered continuously in small samples from each weight sensor.

Operation 400 proceeds at block 404 where a new stable weight reference from the one or more weight sensors is obtained. The new stable reading can be, for example, an average of the weight signals references for a given weight sensor corresponding to a new weight being applied to a weight sensor that is different from the initial stable weight reference. The new stable reading can be indicative of a potential change in the object count for a particular compartment within the cash drawer. The object count can correspond to, in some examples, coins, notes, etc.

Operation 400 proceeds at block 406 where a difference between the new stable reading and the previous stable reading is determined, and the absolute value of the difference between the previous and new stable reference is compared to a "no weighing" threshold. The "no weighing" threshold serves to filter any stable reference measurements indicative of operator error and/or external forces not applicable to a change in currency. For example, the "no weighing" threshold can filter a stable weight measurement indicative of an object that is not currency and should not be factored into the currency count. In another example, if the difference between the new and previous readings results in a value less than a standard weight pertaining to a given currency, the difference can also be filtered. If the absolute difference is not greater than the threshold, operation 400 proceeds at block 408. At block 408, the previous stable reference is replaced by the new stable reference. In this way, a new stable reference is continuously updated to be used as the standard for subsequent weight measurements, thus allowing continuous weight movement and object count to be determined in real time.

If the absolute difference is greater than the "no weighing" threshold, operation 400 proceeds at block 410. At block 410, the weight movement is calculated. As indicated at block 410, the weight movement can be either a positive or negative number, indicative of the difference between the initial and new stable readings. The weight movement is then added to an accumulated weight variable. The accumulated weight variable can be, for example, the previously measured weight of the cash drawer, indicative of the currency count within each compartment of the cash drawer. In another example, the accumulated weight variable can be an accumulation of stable weight measurements from multiple compartments. For instance, if a cashier sorts coins in a cash transaction according to the coin type, where a given coin type goes into a respective compartment, the difference in weights of each compartment can be determined and their resulting values be added. Typically, the weight movement value is in a weight unit such as grams. However, other units may also be used.

Operation 400 proceeds at block 412 where the absolute value of the calculated difference between the previous and new stable reference are compared to a "calculate count threshold". The "calculate count" threshold includes one or more value that determines whether the calculated difference should proceed to currency counting. In one example, the "calculate count" threshold can include one or more set values corresponding to different potential combinations of currency. In another example, the "calculate count" threshold can include a minimum weight value required to enable currency counting, where the minimum weight value corresponds to the minimum possible weight of a particular currency type. If the absolute difference is not greater than the threshold, operation 400 proceeds at block 414. If the absolute difference is greater than the threshold, operation 400 proceeds at block 418.

At block 414, the accumulated weight variable that did not meet the "calculate count" threshold is compared to a minimum weight threshold. The minimum weight threshold can be any minimum weight sufficient to indicate to the auto weighing system that the weight should be discarded. In one example, the minimum weight threshold can be set by the user of the cash drawer. The minimum weight threshold can also be, for example, stored in a data store, such as data store 108 described above with respect to FIG. 1. If the accumulated weight variable is above the minimum weight threshold, then operation 400 proceeds at block 408. If the accumulated weight variable is below the minimum weight threshold, then operation 400 proceeds at block 416. At block 416, both the accumulated weight and accumulated movement are set to zero, indicating that the determined accumulated weight is an invalid value and should not contribute to the overall weight value and currency count. Following block 416, operation 400 proceeds at block 408.

At block 418, if the absolute value of the calculated difference exceeds the "calculate count" threshold, the note/coin/object count is calculated. For example, the detected weight in a $5 compartment can be divided by the weight of a $5 note to determine how many notes are in the compartment. In another example, the detected weight in a $1 compartment and a 25-cent compartment can be divided by, respectively, the weight of a $1 note and a 25-cent coin to determine how many notes and coins are in the combined compartments. The object count movement can also be calculated as a difference from a given initiation value.

From block 418, operation 400 proceeds at block 420 where a confidence metric related to the movement count is calculated. In one example, a confidence metric is calculated based upon how close the difference is to a whole number. In another example, the confidence metric is calculated based on the quality of weight measurements gathered by the weight sensors.

Operation 400 proceeds at block 422, where it is determined whether the count movement met a set confidence threshold based on calculated confidence metric. The confidence threshold can be, for example, a preset minimum value that the confidence metric must exceed in order to proceed in the operation. If the threshold was not met, then operation 400 proceeds at block 424. If the threshold was met, then operation 400 proceeds at block 426.

At blocks 424 and 426, rounding is applied to the count movement before proceeding at block 414. Specifically, if the confidence threshold was met, standard rounding is applied to the count movement and added to the accumulated movement. If the confidence threshold was not met, the count movement is rounded down and added to the accumulated movement. Rounding down can include, in one example, rounding the count movement down to a value in which the confidence threshold is met. Rounding is also applied to the accumulated weight variable.

Figure 5:
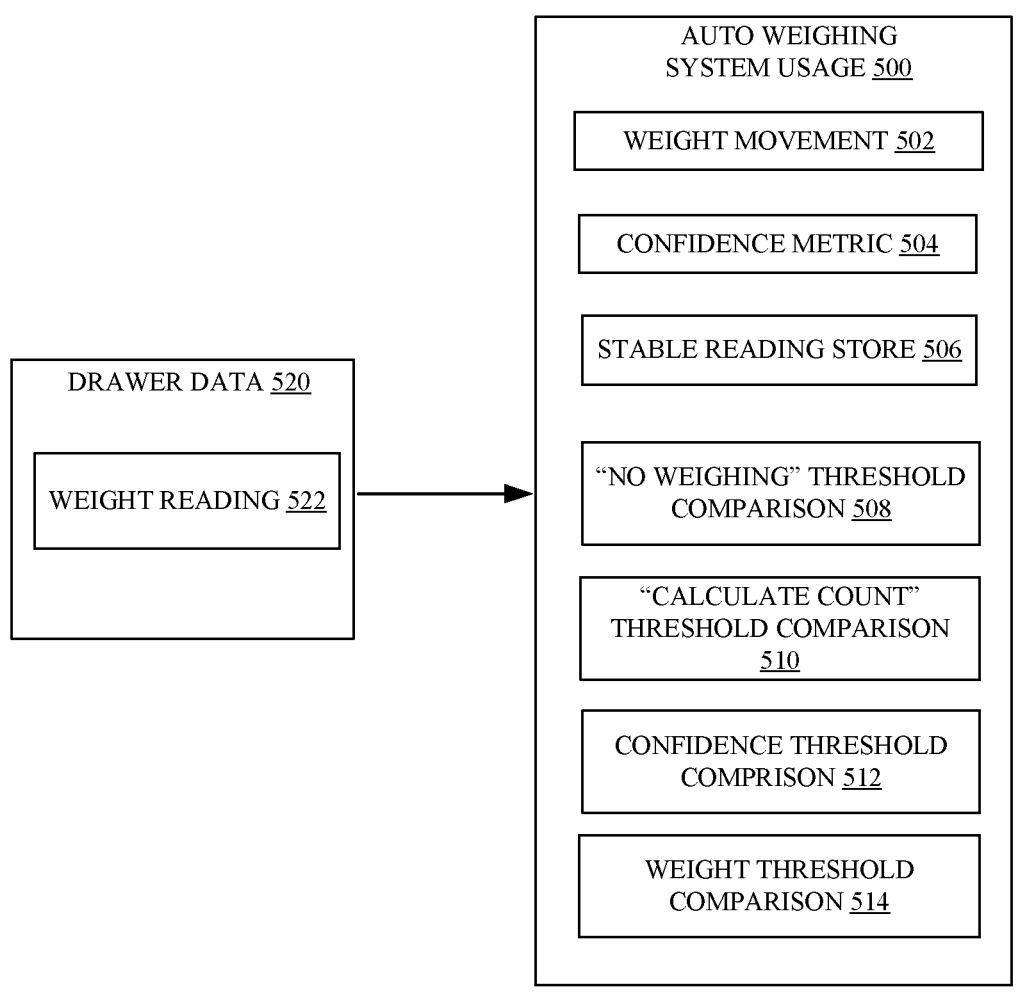
FIG. 5 is a diagram showing example uses for a cash drawer auto weighing system.

FIG. 5 is a diagram showing example uses for a cash drawer auto weighing system. As shown in FIG. 5, drawer data 520 can include information such as, but not limited to, one or more weight readings 522 sensed by one or more weight sensors within the cash drawer. Weight readings 522 can correspond to, for example, a change in the amount of currency (e.g., coins, notes, etc.) within one or more given compartments of the cash drawer. Weight readings 522 can be utilized by the auto weighing system in a number of ways in order to determine weight movement and object count, as indicated by block 500. For example, weight reading 522 can be used to determine weight movement 502, and confidence metric 504. Additionally, the one or more weight readings 522 can be used to generate and store a stable reading 506, as described above. Weight reading 522 can also be used by the auto weighing system in a number of threshold comparisons, such as the "no weighing" threshold comparison 508, "calculate count" threshold comparison 510, confidence threshold comparison 512, and weight threshold comparison 514, described above with respect to FIG. 4. Additionally, it is expressly contemplated that drawer data 520 can be utilized by the auto weighing system in other ways as well.

Figure 6:
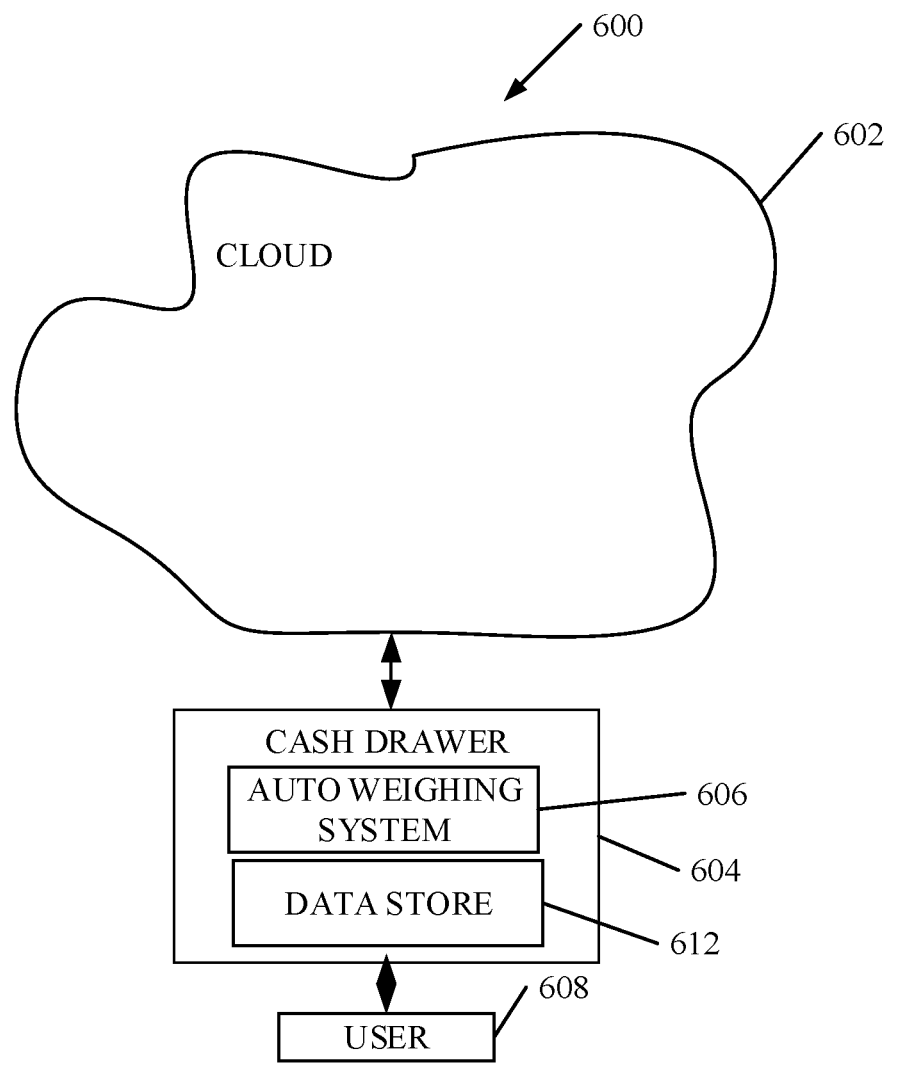
FIG. 6 illustrates a block diagram of one embodiment of a computing environment.

FIG. 6 illustrates a block diagram of one embodiment of a computing environment in which information relating to object count and weight movement can be transmitted to. As indicated above, the object count can include, for example, an updated currency count within cash drawer 604. In one embodiment, FIG. 6 is a block diagram of a cloud computing architecture 600. In general, cloud computing allows for data distribution over a network connection, such as network 602, without requiring a knowledge of the physical location or a configuration of auto weighing system 606. Cloud computing may allow a service provider to provide access to a software application over the network and through a web portal such as a web browser application. In the embodiment shown in FIG. 6, cloud 602 provides cash drawer 604 and thus users access to auto weighing system 606. For instance, user may access the system and its associated components and their functions through an internet browser. The system may supply cash drawer 604 as a single point of access for user 608. FIG. 6 also shows that data store 612 may be included in architecture 600. The various components that interact with system 604 may be included in cloud 602 or separate from the cloud server. Where the components are not included in the cloud server 602, they may be configured to communicate with those that are. As such, cloud architecture 600 allows a user to access all the functionality of system 604 and its data services through a single, intuitive point of access.

The cloud architecture discussed herein may include one or more configurations of either public or private cloud computing, or a combination of both public and private cloud computing. The level of security applied to the cloud computing environment may be uniquely configured by the vendor of the cloud services. In addition, the broker or vendor of local data systems may be able to configure the level of cloud environment security.

Figure 7:
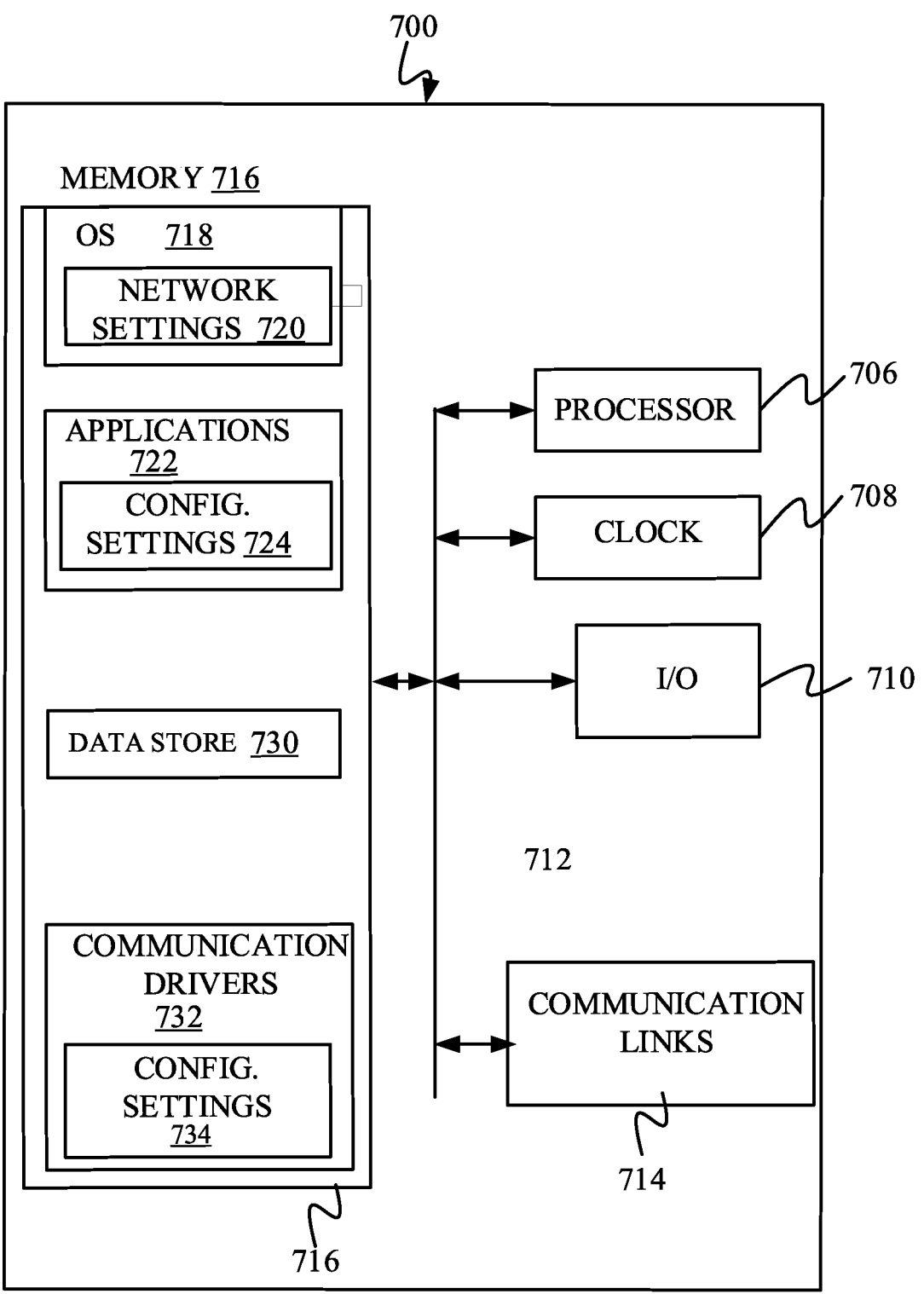
FIG. 7 illustrates a simplified block diagram of one embodiment of a computing device.

FIG. 7 illustrates a simplified block diagram of one embodiment of a computing device in which information relating to object count and weight movement can be transmitted to. Communication link 714 is provided in device 700 to allow device 700 to communicate with the various components of system 606 and other devices. Link 714 may include a variety of channels for receiving information and connecting device 700 to a network. As such, device 700 may be configured to communicate to other devices and applications operating in or through cloud 602.

In one embodiment, the various component of device 700 are interconnected by a communication bus, generally indicated by 712 . . . . Thus, communication links 714 communicate with processor 706. These components may communicate via communication bus 712, and are also connected to clock 708 and input/output component (I/O) 710.

Clock 708 may include a real time clock that outputs a time and date, and may provide timing functionality to processor 706.

I/O components 710 may include components such as hardware and software input buttons, touch sensors, optical sensors, microphones, touch sensitive display screens, proximity sensors, light sensors, accelerometers, orientation sensors, compass sensors. Output components may include display devices, user interface components, a speaker, a vibration mechanism, and/or a printer port, for example. A variety of other I/O components may also be used.

Memory 716 illustratively shows storage of operating system (OS) 718, network settings 720, applications 722, configuration settings 724, data store 730, communication drivers 732, and communication configuration settings 734. Memory 716 may include volatile and non-volatile memory storage, computer storage media, and any other type of memory storage.

Applications 722 may include applications that have been previously stored on device 700 or applications that are installed during use of auto weighing system 606, for example. Applications 722 may also include cloud-based applications that are provided by a software as a service (SaaS).

Although the present invention has been described with reference to preferred embodiments, workers skilled in the art will recognize that changes may be made in form and detail without departing from the spirit and scope of the invention.

What is claimed is:

1. A method of operating a cash drawer, comprising:
acquiring a first stable weight reading from one or more weight sensors of the cash drawer;
acquiring a second stable weight reading from the one or more weight sensors of the cash drawer;
acquiring a noise signal from the one or more weight sensors of the cash drawer;
filtering, with a processor of the cash drawer, the first stable weight reading and the second stable weight reading from the noise signal;
calculating, with the processor of the cash drawer, a difference between the second stable weight reading and the first stable weight reading;
comparing, with the processor of the cash drawer, the difference between the second stable weight reading and the first stable weight reading to a no-weighing threshold;
selectively comparing, with the processor of the cash drawer, the difference between the second stable weight reading and the first stable weight reading to a calculate count threshold, the difference between the second stable weight reading and the first stable weight reading exceeds the no-weighing threshold;
selectively processing, with the processor of the cash drawer, the difference between the second stable weight reading and the first stable weight reading to produce an object count movement, the difference between the first stable weight reading and the second stable weight reading exceeds the calculate count threshold, the object count movement being indicative of a change in currency within the cash drawer, based on the first stable weight reading and the second stable weight reading.

2. The method of claim 1, further comprising:
calculating a confidence metric indicative of a confidence level of the produced object count movement based on the difference between the second stable weight reading and the first stable weight reading.

3. The method of claim 2, further comprising:
comparing the confidence metric to a confidence threshold; and
rounding the object count movement based on the comparison between the confidence metric to the confidence threshold; and adding the rounded object count movement to a previous count movement to produce an accumulated movement.

4. The method of claim 3, wherein rounding the object count movement comprises rounding down the object count movement after the confidence metric does not meet the confidence threshold.

5. The method of claim 4, further comprising:
comparing the difference between the second stable weight reading and the first stable weight reading to a minimum weight threshold.

6. The method of claim 5, further comprising:
selectively assigning the difference between the second stable weight reading and the first stable weight reading and rounded object count movement to a value of zero based on whether the weight movement meets the minimum weight threshold.

7. The method of claim 5, further comprising:
selectively assigning the first stable weight reading to the second stable weight reading based on whether the difference between the second stable weight reading and the first stable weight reading meets the minimum weight threshold.

8. A method of operating a cash drawer, comprising:
acquiring a first stable weight reading from a weight sensor of the cash drawer;
acquiring a second stable weight reading from the weight sensor of the cash drawer;
acquiring a noise signal from the weight sensor of the cash drawer;
filtering, with a processor of the cash drawer, the first stable weight reading and the second stable weight reading from the noise signal;
calculating, with the processor of the cash drawer, a difference between the second stable weight reading and the first stable weight reading;
comparing, with the processor of the cash drawer, the difference between the second stable weight reading and the first stable weight reading to a no-weighing threshold;
selectively overwriting, with the processor of the cash drawer, the first stable weight reading with the second stable weight reading, the difference between the second stable weight reading and the first stable weight reading is less than the no-weighing threshold;
acquiring a new second stable weight reading from the weight sensor of the cash drawer and calculating the difference between the first stable weight reading and the new second stable weight reading;
comparing, with the processor of the cash drawer, the difference between the first stable weight reading and the new second stable weight reading to the no-weighing threshold;
selectively processing, with the processor of the cash drawer, the difference between the new second stable weight reading and the first stable weight reading to produce an object count, indicative of a currency value within the cash drawer, the difference between the first stable weight reading and the new second stable weight reading exceeds the no-weighing threshold; and
transmitting, with the processor of the cash drawer, the object count to a user.

9. A method of operating a cash drawer, comprising:
acquiring a first stable weight reading from one or more weight sensors of the cash drawer;
acquiring a second stable weight reading from the one or more weight sensors of the cash drawer;

acquiring a noise signal from the one or more weight sensors of the cash drawer;

filtering, with a processor of the cash drawer, the first stable weight reading and the second stable weight reading from the noise signal;

calculating, with the processor of the cash drawer, a difference between the second stable weight reading and the first stable weight reading;

comparing, with the processor of the cash drawer, the difference between the second stable weight reading and the first stable weight reading to a no-weighing threshold;

selectively comparing, with the processor of the cash drawer, the difference between the second stable weight reading and the first stable weight reading to a calculate count threshold, the difference between the second stable weight reading and the first stable weight reading exceeds the no-weighing threshold; and selectively comparing, with the processor of the cash drawer, accumulated weight to a minimum weight threshold, the difference between the first stable weight reading and the second stable weight reading does not exceed the calculate count threshold;

determining, with the processor of the cash drawer, that the accumulated weight is below the minimum weight threshold; and setting, with the processor of the cash drawer, accumulated movement and accumulated weight to zero based on the determination.

* * * * *